United States Patent [19]

Stansfield et al.

[11] 4,398,955

[45] Aug. 16, 1983

[54] DISPERSIONS

[75] Inventors: James F. Stansfield; James Toole; Arthur Topham, all of Manchester, England

[73] Assignee: Imperial Chemical Industries PLC, London, England

[21] Appl. No.: 276,516

[22] Filed: Jun. 23, 1981

Related U.S. Application Data

[63] Continuation-in-part of Ser. No. 180,810, Aug. 25, 1980, abandoned, which is a continuation of Ser. No. 877,390, Feb. 13, 1978, Pat. No. 4,213,028.

[30] Foreign Application Priority Data

Feb. 21, 1977 [GB] United Kingdom ................ 7185/77

[51] Int. Cl.$^3$ ............................................. C09D 11/00
[52] U.S. Cl. ................................ 106/23; 106/308 N; 106/308 Q
[58] Field of Search ................ 106/23, 288 B, 288 Q, 106/308 Q, 308 S, 308 N

[56] References Cited

U.S. PATENT DOCUMENTS

| | | | |
|---|---|---|---|
| 3,841,888 | 10/1974 | Beide et al. | 106/288 Q |
| 3,928,276 | 12/1975 | Linden et al. | 260/342 |
| 4,101,690 | 7/1978 | Miyamoto et al. | 106/23 |

FOREIGN PATENT DOCUMENTS 1164265  9/1969  United Kingdom .

*Primary Examiner*—John Kight, III
*Assistant Examiner*—Amelia B. Yarbrough
*Attorney, Agent, or Firm*—Cushman, Darby & Cushman

[57] ABSTRACT

A dispersion of a particulate solid in a polar organic medium in the presence of a dispersing agent which is a tertiary amine or a salt thereof with a mineral acid or an aromatic carboxylic or sulphonic acid, the amine containing at least one polymeric group which is a poly(-lower alkylene oxy) chain or a poly(carbonyl lower alkylene oxy) chain and inks, paints and similar formulations made from such a dispersion.

10 Claims, No Drawings

DISPERSIONS

CROSS REFERENCE TO RELATED APPLICATIONS

This application is a continuation-in-part of our earlier application Ser. No. 180,810 filed Aug. 25, 1980, now abandoned, which is a continuation of our earlier application Ser. No. 877,930 filed Feb. 13, 1978, now U.S. Pat. No. 4,213,028.

The invention relates to dispersions of solids in polar organic liquids in the presence of a dispersing agent.

According to the present invention we provide a dispersion of a particulate solid in a polar organic medium in the presence of a dispersing agent which is a tertiary amine or a salt thereof with an aromatic carboxylic or sulphonic acid, the amine containing at least one polymeric group which is a poly(lower alkylene oxy) chain comprising at least 50% propyleneoxy groups or a poly(carbonyl lower alkylene oxy) chain.

By the term lower alkylene in the above definition of the dispersing agent we mean an alkylene group containing from two to eight and preferably from two to four carbon atoms.

Where the dispersing agent contains a poly(lower alkylene oxy) chain or chains it is desirable that at least 65% and preferably from 75% to 100% of the lower alkylene oxy groups are propylene oxy groups, the remainder preferably being ethylene oxy groups. It is however further preferred that the polymeric group comprises a poly(propylene oxy) chain linked to the nitrogen atom of the tertiary amine by an ethylene oxy group.

Each poly(lower alkylene oxy) chain preferably carries from 3 to 50 lower alkylene oxy groups and more preferably from 7 to 30 of such groups. It is also preferred that there are from 1 to 3 and more preferably one such poly(lower alkylene oxy) chains contained in each molecule of the dispersing agent.

Where the dispersing agent contains a poly(carbonyl lower alkylene oxy) chain or chains it is preferred that the lower alkylene group contains 5 carbon atoms preferably as a chain of 5 methylene groups which lie between the oxygen atom and the carbonyl group, so that the dispersing agent contains one or more poly(E-caprolactone) chains. Each poly(carbonyl lower alkylene oxy) chain preferably contains from 3 to 50 carbonyl lower alkylene oxy groups and more preferably from 7 to 20 such groups. It is also preferred that there are one or two, especially one, poly(carbonyl lower alkylene oxy) chain contained in the dispersing agent.

The term polar organic medium includes organic liquids capable of forming moderate or strong hydrogen bonds as described in the article entitled "A three dimensional approach to solubility" by Crowley et al in Journal of Paint Technology, Vol. 38, 1966, at page 269. Such organic liquids generally have a hydrogen bonding number of 5 or more as defined in the above-mentioned article.

As examples of such polarorganic liquids there may be mentioned, amines, ethers, especially lower alkyl ethers, organic acids, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in Table 2.14 on pages 39 and 40 and these liquids all fall within the scope of the term polar organic liquid as used in this specification.

Preferred polar organic liquids are dialkyl ketones, alkyl esters of alkanecarboxylic acids, alkanols and especially those containing up to and including a total of 6 carbon atoms. As examples of the preferred and especially preferred liquids there may be mentioned dialkyl ketones such as acetone, methylethylketone (MEK), diethylketone, diisopropylketone, methylisobutylketone and diisobutylketone; alkyl esters such as methyl acetate, ethyl acetate, isopropyl acetate, ethylformate, methyl propionate and ethyl butyrate and alkanols such as methanol, ethanol, n-propanol, isopropanol, n-butanol and isobutanol.

It is preferred that the particulate solid is a pigment or a dyestuff. Where the solid is an inorganic pigment it is preferred that the dispersing agent is a free tertiary amine as hereinbefore defined or the salt thereof with a mineral acid or with an aromatic carboxylic or sulphonic acid and that the polar organic liquid is a lower alkanol.

As examples of inorganic pigments there may be mentioned titanium dioxide, zinc oxide, cadmium sulphide, iron oxides, vermillion, ultramarine and chrome pigments including chromates of lead, zinc, barium and calcium, the various mixtures and modifications thereof such as are commercially available as greenish-yellow to red pigments under the names primrose, lemon, middle, orange, scarlet and red chromes and especially Prussian Blue. Such pigments are described in, for example, Volume 2 of the 2nd Edition of the Colour Index which was published in 1956 under the heading "Pigments" and in subsequent authorised amendments thereto.

A preferred form of the tertiary amine which may be used as the dispersing agent either directly, or in the form of a substituted ammonium salt with a mineral acid or an aromatic sulphonic or carboxylic acid, has the general formula:

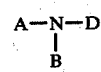

wherein each of A, B and D independently represents

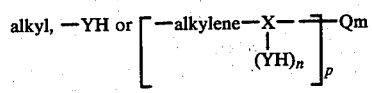

wherein each X independently represents an oxygen or a nitrogen atom provided that, where X is oxygen m+n=1 and p=1 and where X is nitrogen m+n=2 and p is from 1 to 30; each Q independently represents alkyl or —YH; and each Y independently represents a poly(lower alkylene oxy) chain containing from 3 to 50 lower alkylene oxy groups provided that, (i) at least one of A, B and D contains a poly(lower alkylene oxy) chain, and (ii) not more than one of the alkylene or alkyl groups contains more than 8 carbon atoms.

In the above formula the alkyl and alkylene groups, which preferably contain not more than 8, and more preferably not more than 6, carbon atoms, may be substituted provided the substituents do not contain active or ionisable hydrogen atoms but it is preferred that they be unsubstituted. As examples of suitable substituents there may be mentioned chlorine, bromine and cyano.

It is preferred that each poly(lower alkylene oxy) chain contains not more than one ethylene oxy group and further that this is attached directly to the N atom of the amine, the remaining groups being propylene oxy groups. The preferred value for p is 1 and it is further preferred that X is oxygen.

Preferred amines of the general formula:

$$A-\underset{\underset{B}{|}}{N}-D$$

are:
alkyl-N-(-YN)$_2$,
alkyl N-(alkylene-O-YH)$_2$,
N-(alkylene-O-YH)$_3$,
and especially (alkyl)$_2$N-alkylene-O-YH,
wherein Y has the meaning hereinbefore defined, and especially wherein the alkylene is ethylene and YH is a poly(propylene oxy) chain.

As specific examples of suitable amines there may be mentioned:

(CH$_3$CH$_2$)$_2$NCH$_2$CH$_2$O(CH$_2$.CH(CH$_3$)O)$_4$H,
(CH$_3$CH$_2$)$_2$NCH$_2$CH$_2$O(CH$_2$—CH(CH$_3$)O)$_{12}$H,
(CH$_3$)$_2$NCH$_2$CH$_2$O[CH$_2$—CH(CH$_3$)O]$_{17}$H,
N—[CH$_2$CH$_2$O(CH$_2$—CH(CH$_3$)O)$_{12}$H]$_3$,

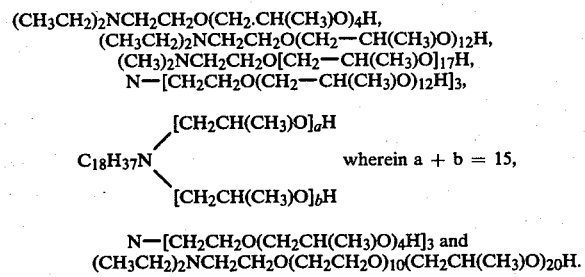
wherein a + b = 15,

N—[CH$_2$CH$_2$O(CH$_2$CH(CH$_3$)O)$_4$H]$_3$ and
(CH$_3$CH$_2$)$_2$NCH$_2$CH$_2$O(CH$_2$CH$_2$O)$_{10}$(CH$_2$CH(CH$_3$)O)$_{20}$H.

The dispersions of the invention preferably contain from 10% to 80% and more especially from 20% to 70% by weight of the solid based on the total weight of the dispersion depending on the density of the solid, although for reasons of economy it is desirable to operate at pigment concentrations of about 40%, more preferably at least 50% by weight. The quantity of dispersing agent contained in these dispersions is preferably from 2% to 50% and more especially from 5% to 30% by weight based on the weight of the solid. The achievement of finely divided inorganic pigment dispersions containing 50% or more by weight of pigment is an important feature of the present invention which can lead to significant improvements in the economics of ink and paint manufacture.

The dispersions of the invention are particularly useful in the preparation of inks based on polar solvents especially printing inks for use in package printing. They are however also of use in stationery inks and paints which are based on polar solvents. Where the solvent is compatible with a plastics material, e.g. a plasticiser, the dispersion may be used to introduce the solid, especially where the solid is a pigment, into the plastics material.

According to a further feature of the invention we provide an ink, especially a printing ink, or a paint prepared from a dispersion as hereinbefore defined by addition of the other ingredients conventionally present in such ink or paint, e.g. binders, thickeners, preservatives and further solvents, as diluent.

The inks which are made from the above mentioned dispersions have enhanced gloss, transparency, brightness and strength compared with such compositions not containing these components or prepared by adding the dispersing agent to a conventional ink made by milling the pigment or dyestuff in the presence of the binder.

The dispersions of the invention can be obtained by any of the conventional and well known methods of preparing dispersions. Thus the solid, the dispersing agent and the polar organic medium preferably in a liquid form may be mixed in any order and the mixture then subjected to a mechanical treatment to reduce the particle size of the solid, for example by ball milling, bead milling or gravel milling until a dispersion is formed in which the mean diameter of the particles of the solid is desirably less than 10 microns and preferably less than 1 micron.

Where the dispersing agent is the salt of a tertiary amine with an acid it is preferred to prepare the dispersing agent in situ by mixing together the amine, the acid and the polar organic medium following which the amine and acid react together to form the amine salt which is the dispersing agent. The solid is then added and the dispersion prepared as hereinbefore described.

Whilst the dispersing agent may be soluble to a substantial extent in the polar organic medium it is not essential that it is more than sparingly soluble and in fact there is some advantage with sparingly soluble dispersing agents since these have a lesser tendency to bleed during applications of the dispersions and inks made from them.

The dispersing agents containing a poly(lower alkylene oxy) chain which are used to form the dispersions of the invention may be prepared by reacting the appropriate lower alkylene oxide or mixture of such oxides with an amine containing active hydrogen atoms, e.g. those present in amino and hydroxyl groups, so that each active hydrogen atom is replaced by a poly(lower alkylene oxy) chain, in a known manner.

The dispersing agents containing a poly(carbonyl lower alkylene oxy) chain which are used to form the dispersions of the invention may be prepared by reacting the appropriate lower alkylene lactone with a tertiary amine containing at least one primary or secondary amino group or a hydroxyl group in a known manner so that each of such groups becomes substituted by a poly(carbonyl lower alkylene oxy) chain.

The agents labelled Agent A to I described below are used either as such or after neutralisation with an acid as dispersing agents to form the dispersions described in the Examples which follow and which serve to further illustrate the present invention.

Agent A

8 Parts of potassium are dissolved in 450 parts of 2-diethylaminoethanol and propylene oxide is added at 105° C. under increased pressure until the equivalent by titration with acid reaches 420.

The following are prepared in a similar manner from hydroxyamines and propylene oxide:

| Agent | Hydroxyamine | Equivalent |
|---|---|---|
| B | 2-diethylaminoethanol | 806 |
| C | triethanolamine | 875 |
| D | " | 2130 |
| E | 2-dimethylaminoethanol | 1095 |

Agent F

A mixture of 71.3 parts of E-caprolactone, 8.1 parts of 3-dimethylaminopropylamine and 0.1 parts of tetrabutyl titanate is stirred for 1½ hours at 160°–165° C. under nitrogen. On cooling it forms a hard wax of equivalent 1016.

Agent G

This is prepared similarly but using 150.6 parts of caprolactone. The wax has an equivalent of 2050.

Agent H

This is an adduct prepared from one molecular proportion of 2-diethylaminoethanol and a mixture of 9 molecular proportions of ethylene oxide and 9 molecular proportions of propylene oxide.

Agent I

30 Parts of polyethyleneimine of molecular weight 1200 (sold as PEI-12 by Dow Corp.) is stirred at 40°–50° C. whilst 81.8 parts of propylene oxide is gradually added during 1½ hours. After removing unchanged propylene oxide at 100°/18 mm the product weighs 74.3 parts. A solution of 1.55 parts of potassium hydroxide in 2.65 parts of water is added and the water removed at 100° C./18 mm. The mixture is stirred at 100°–110° C. whilst 204 parts of propylene oxide is added during 30 hours. After removing unchanged propylene oxide at 100/18 mm the yield is 275 parts of pale amber coloured viscous liquid.

EXAMPLE 1

A mixture of 0.53 part of Agent B, 0.37 part of a copper phthalocyanine sulphonic acid of average degree of sulphonation 1.3 and 6.1 parts of ethanol is ball milled for 2 hours to form the salt, then 3 parts of β-form copper phthalocyanine is added and milling continued for a further 16 hours, to give a fluid dispersion of the pigment which is suitable for use in a printing ink, e.g. for gravure or flexographic printing.

The following table gives further examples of fluid dispersions of the invention which are obtained by milling together in the manner described above (except that when the copper phthalocyanine sulphonic acid is omitted the initial 2 hours milling without pigment is unnecessary) the pigment and the number of parts thereof listed in column 2 of the table, the agents and the number of parts thereof listed in columns 3 and 4 of the table and sufficient of the organic liquids listed in column 5 of the table to bring the total weight to 10 parts. In the table CPC stands for copper phthalocyanine. Propomeen HT/25 is an adduct from crude octadecylamine and 15 molecular proportions of propylene oxide (Propomeen is a Trade Mark belonging to Armour-Hess).

| Ex. | Pigment and amount thereof | Agent and amount thereof | copper phthalocyanine sulphonic acid and amount thereof | Organic liquid |
|---|---|---|---|---|
| 2 | 3 parts of β-form CPC | 0.38 part of Agent A | 0.52 part of CPC (SO₃H)₁.₃ | ethanol |
| 3 | 3 parts of β-form CPC | 0.51 part of Agent B | 0.31 part of CPC monosulphonic acid | " |
| 4 | 3 parts of β-form CPC | 0.54 part of Agent C | 0.36 part of CPC (SO₃H)₁.₃ | " |
| 5 | 3 parts of β-form CPC | 0.71 part of Agent D | 0.19 part of CPC (SO₃H)₁.₃ | " |
| 6 | 3 parts of β-form CPC | 0.59 part of Agent E | 0.31 part of CPC (SO₃H)₁.₃ | " |
| 7 | 3 parts of β-form CPC | 0.42 part of Agent B | 0.18 part of CPC (SO₃)H₁.₃ | " |
| 8 | 3 part of polychloro CPC | 0.53 part of Agent B | 0.37 part of CPC (SO₃H)₁.₃ | " |
| 9 | 3 parts of carbon black | 0.53 part of Agent B | 0.37 part of CPC (SO₃H)₁.₃ | " |
| 10 | 3 parts of indanthrone | 0.53 part of Agent B | 0.37 part of CPC (SO₃H)₁.₃ | " |
| 11 | 3 parts of α-form partially chlorinated CPC | 0.53 part of Agent B | 0.37 part of CPC (SO₃H)₁.₃ | " |
| 12 | 3 parts β-form CPC | 0.53 part of Agent B | 0.37 part of CPC (SO₃H)₁.₃ | isopropanol |
| 13 | 3 parts β-form CPC | 0.6 part of Propomeen HT/25 | 0.3 part of CPC (SO₃H)₁.₃ | " |
| 14 | 3 parts β-form CPC | 0.58 part of Agent F | 0.32 part of CPC (SO₃H)₁.₃ | methyl-ethyl-ketone |
| 15 | 3 parts β-form CPC | 0.7 part of Agent G | 0.2 part of CPC (SO₃H)₁.₃ | methyl-ethyl-ketone |
| 16 | 3 parts β-form CPC | 0.7 part of Agent G | 0.2 part of CPC (SO₃H)₁.₃ | ethyl-acetate |
| 17 | 3 parts β-form CPC | 0.53 part of Agent B | 0.37 part of CPC (SO₃H)₁.₃ | butanol |
| 18 | 3 parts of Prussian Blue | 0.9 part of Agent A | Nil | ethanol |
| 19 | 3 parts of Prussian Blue | 0.1 part of Agent B | " | " |
| 20 | 3 parts of Prussian Blue | 0.5 part of Propomeen HT/25 | " | " |
| 21 | 7 parts of lead sulphochromate | 0.35 part of Agent B | " | " |
| 22 | 5 parts of chromium oxide | 0.5 part of Agent B | " | " |
| 23 | 5 parts of titanium dioxide | 0.5 part of Agent B | " | " |
| 24 | 7 parts of iron oxide | 0.7 part of Agent B | " | " |
| 25 | 5 parts of Prussian Blue | 0.5 part of Propomeen HT/25 | " | isopropanol |
| 26 | 5 parts of Prussian Blue | 0.5 part of the hydrochloride of Agent B | " | ethanol |
| 27 | 5 parts of Prussian Blue | 0.5 part of the sulphate of Agent B | " | " |
| 28 | 5 parts of Prussian Blue | 0.5 part of the acetate of Agent B | " | " |
| 29 | 5 parts of Prussian Blue | 0.5 part of the benzoate of Agent B | " | " |
| 30 | 5 parts of Prussian Blue | 0.5 part of the p-toluene-sulphonate of Agent B | " | " |
| 31 | 3 parts of β-form CPC | 0.61 part of Agent H | 0.29 part of CPC (SO₃H)₁.₃ | " |
| 32 | 3 parts of β-form CPC | 0.53 part of Agent I | 0.37 part of CPC (SO₃H)₁.₃ | " |

EXAMPLE 33

20 Parts of β-copper phthalocyanine is mixed with 80 parts of a varnish medium consisting of 15 parts of nitrocellulose, 17 parts of isopropyl acetate, 58 parts of ethanol 740P, 4.8 parts of Agent B and 3.2 parts of CPC $(SO_3H)_{1.3}$. The mixture is milled for 18 hours in a Ball Mill before dilution with 100 parts of a varnish medium comprising 15 parts nitrocellulose, 17 parts isopropyl acetate and 68 parts of ethanol 740P. This mill base is suitable for mixing with further solvent, varnish or other conventional additives for use in printing inks or other surface coating compositions.

We claim:

1. A process for the preparation of a dispersion of an inorganic pigment in a polar organic medium, said process consisting essentially of grinding the pigment in the polar organic medium in the presence of a dispersing agent, in which the dispersing agent is a tertiary amine of the formula:

wherein each of A, B and D independently represents

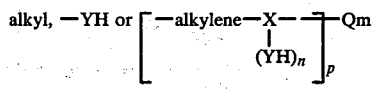

wherein each X independently represents an oxygen or a nitrogen atom provided that, where X is oxygen $m+n=1$ and $p=1$ and where X is nitrogen $m+n=2$ and p is from 1 to 30; each Q independently represents alkyl or —YH; and each Y independently represents a poly(lower alkylene oxy) chain containing from 3 to 50 lower alkylene oxy groups provided that, (i) at least one of A, B and D contains a poly(lower alkylene oxy) chain, (ii) at least 50% of the lower alkylene groups in each poly(lower alkylene oxy) chain is propylene and (iii) not more than one of the alkylene or alkyl groups contains more than 8 carbon atoms; or the salt of said amine with a mineral acid or with an aromatic carboxylic or sulphonic acid.

2. A pigment dispersion consisting essentially of an inorganic pigment, a polar organic medium and a tertiary amine of the formula:

wherein each of A, B and D independently represents

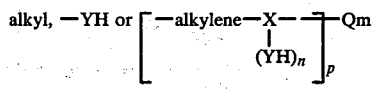

wherein each X independently represents an oxygen or a nitrogen atom provided that, where X is oxygen $m+n=1$ and $p=1$ and where X is nitrogen $m+n=2$ and p is from 1 to 30; each Q independently represents alkyl or —YH; and each Y independently represents a poly(lower alkylene oxy) chain containing from 3 to 50 lower alkylene oxy groups provided that, (i) at least one of A, B and D contains a poly(lower alkylene oxy) chain, (ii) at least 50% of the lower alkylene groups in each poly(lower alkylene oxy) chain is propylene and (iii) not more than one of the alkylene or alkyl groups contains more than 8 carbon atoms; or the salt of said amine with a mineral acid or with an aromatic carboxylic or sulphonic acid.

3. A dispersion according to claim 2 wherein at least 65% of the lower alkylene groups in each poly(lower alkylene oxy) chain are propylene.

4. A dispersion according to claim 2 wherein there are from 7 to 30 alkylene oxy groups in each chain.

5. A dispersion according to claim 2 wherein the dispersing agent has the formula:

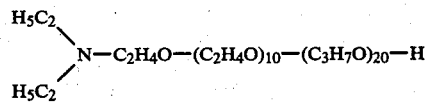

6. A dispersion according to claim 1 wherein the polar organic liquid is selected from the group comprising amines, ethers, organic acids, esters, ketones, glycols, alcohols and amides.

7. A dispersion according to claim 2 containing from 20% to 80% by weight of pigment.

8. A dispersion according to claim 7 containing at least 40% by weight of pigment.

9. A dispersion according to claim 7 containing at least 50% by weight of pigment.

10. A dispersion according to claim 2 containing from 2 to 50% by weight based on the weight of the pigment, of the dispersing agent.

* * * * *